US012645811B2

(12) United States Patent
Mizuta et al.

(10) Patent No.: US 12,645,811 B2
(45) Date of Patent: Jun. 2, 2026

(54) NESTED PERMISSIONS POLICY GENERATION

(71) Applicant: Oracle International Corporation, Redwood Shores, CA (US)

(72) Inventors: Kenichi Mizuta, Los Altos, CA (US); Aaron Miles Phillips, Brighton, CO (US); Ning Dong, Fremont, CA (US); Sahithi Katanguri, Kirkland, WA (US); Tao Zhang, Kirkland, WA (US); Achyut Neupane, Georgetown, TX (US); Saurabh Verma, Redmond, WA (US); Rakesh Dev Dwara, Flower Mound, TX (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/922,825

(22) Filed: Oct. 22, 2024

(65) Prior Publication Data

US 2026/0064864 A1 Mar. 5, 2026

Related U.S. Application Data

(60) Provisional application No. 63/688,812, filed on Aug. 29, 2024.

(51) Int. Cl.
*G06F 21/60* (2013.01)

(52) U.S. Cl.
CPC .... *G06F 21/604* (2013.01); *G06F 2221/2113* (2013.01); *G06F 2221/2141* (2013.01); *G06F 2221/2145* (2013.01)

(58) Field of Classification Search
CPC ..... G06F 21/604; G06F 21/6218–6281; G06F 2221/2113; G06F 2221/2141; G06F 2221/2145; H04L 63/10–108
See application file for complete search history.

(56) References Cited

U.S. PATENT DOCUMENTS

| | | | |
|---|---|---|---|
| 11,509,658 B1 * | 11/2022 | Kulkarni | H04W 12/60 |
| 2008/0133530 A1 * | 6/2008 | Wang | G06F 21/6218 707/E17.135 |
| 2024/0430306 A1 * | 12/2024 | Gavish | H04L 63/105 |

* cited by examiner

*Primary Examiner* — Kevin Bechtel
(74) *Attorney, Agent, or Firm* — Invoke

(57) ABSTRACT

Techniques for generating permissions policies for nested sets of software artifacts are disclosed. A system detects a selection of a target action and a target software artifact. The system identifies an entity associated with the selection. The system analyzes permissions metadata of the target software artifact to identify user-defined permission configuration rules specifying one or more additional software artifacts and one or more additional actions associated with the additional software artifacts. The system performs an iterative analysis of permissions metadata in the nested software artifacts to generate a composite permissions policy for the entity that combines the permissions specified in the user-defined permission configuration rules for the set of nested software artifacts.

20 Claims, 6 Drawing Sheets

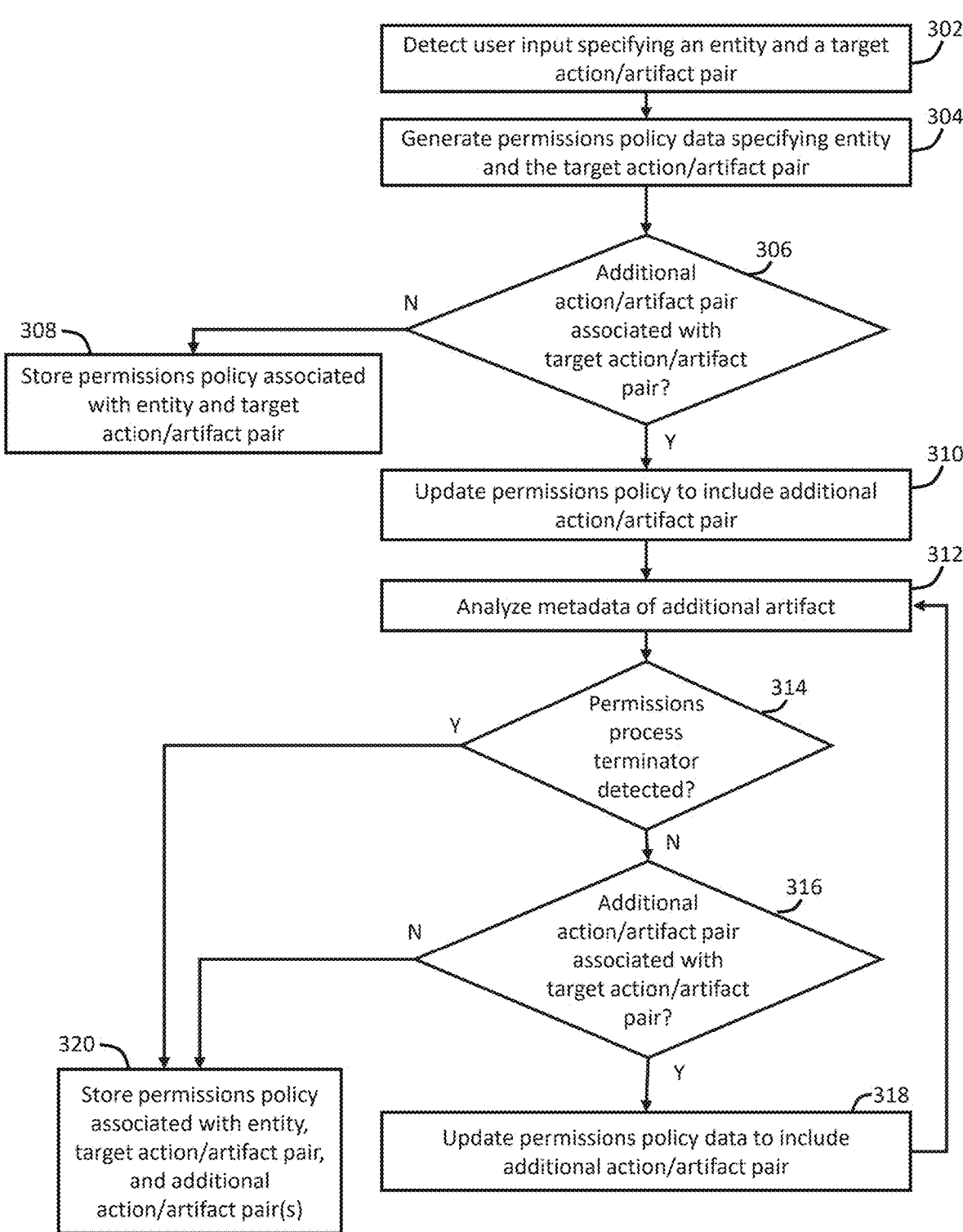

302 — Detect user input specifying an entity and a target action/artifact pair

304 — Generate permissions policy data specifying entity and the target action/artifact pair 306 — Additional action/artifact pair associated with target action/artifact pair?

N

308 — Store permissions policy associated with entity and target action/artifact pair

Y

310 — Update permissions policy to include additional action/artifact pair

312 — Analyze metadata of additional artifact

314 — Permissions process terminator detected?

Y

N

316 — Additional action/artifact pair associated with target action/artifact pair?

N

320 — Store permissions policy associated with entity, target action/artifact pair, and additional action/artifact pair(s)

Y

318 — Update permissions policy data to include additional action/artifact pair

NESTED PERMISSIONS POLICY GENERATION

BENEFIT CLAIMS; RELATED APPLICATIONS; INCORPORATION BY REFERENCE

This application claims the benefit of U.S. Provisional Patent Application 63/688,812, filed Aug. 29, 2024. The contents of Provisional Patent Application 63/688,812 are hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to generating permissions policies for accessing software artifacts. In particular, the present disclosure relates to generating permissions policies for access to entities to perform actions associated with software artifacts based on identifying sets of related permissions by using hierarchies and nesting.

BACKGROUND

Microservices applications are made up of independently deployable software components that may be coupled to each other to build applications. In a microservices environment, different programming and administrative teams may generate and manage different software components. Some functions of software components may access other software components developed and/or managed by other teams. For example, one team may develop a user interface (UI) to present business documents. Another team may develop and maintain invoice-type documents and files. Yet another team may develop customer accounts data objects that may be used to populate invoices. The UI may be capable of functioning without the invoice-type documents, such as personnel documents and client data. When the UI is used to access invoice-type documents, a user may require certain permissions, such as permission to view and/or edit customer data.

In the microservices environment, teams that develop and/or maintain software components may specify the additional software components that may be used to provide additional functionality to a target component. However, different software components in a chain of dependent software components that together would provide the desired functionality for a user may be generated and maintained by different teams. A security administrator tasked with granting user permissions may not be able to identify every software component in the chain of dependent software components that is required to provide the user with the desired functionality.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 3 is a flow diagram illustrating operations for generating permission policies based on nested sets of artifact/action pairs according to one or more embodiments;

DETAILED DESCRIPTION

Figure 1:
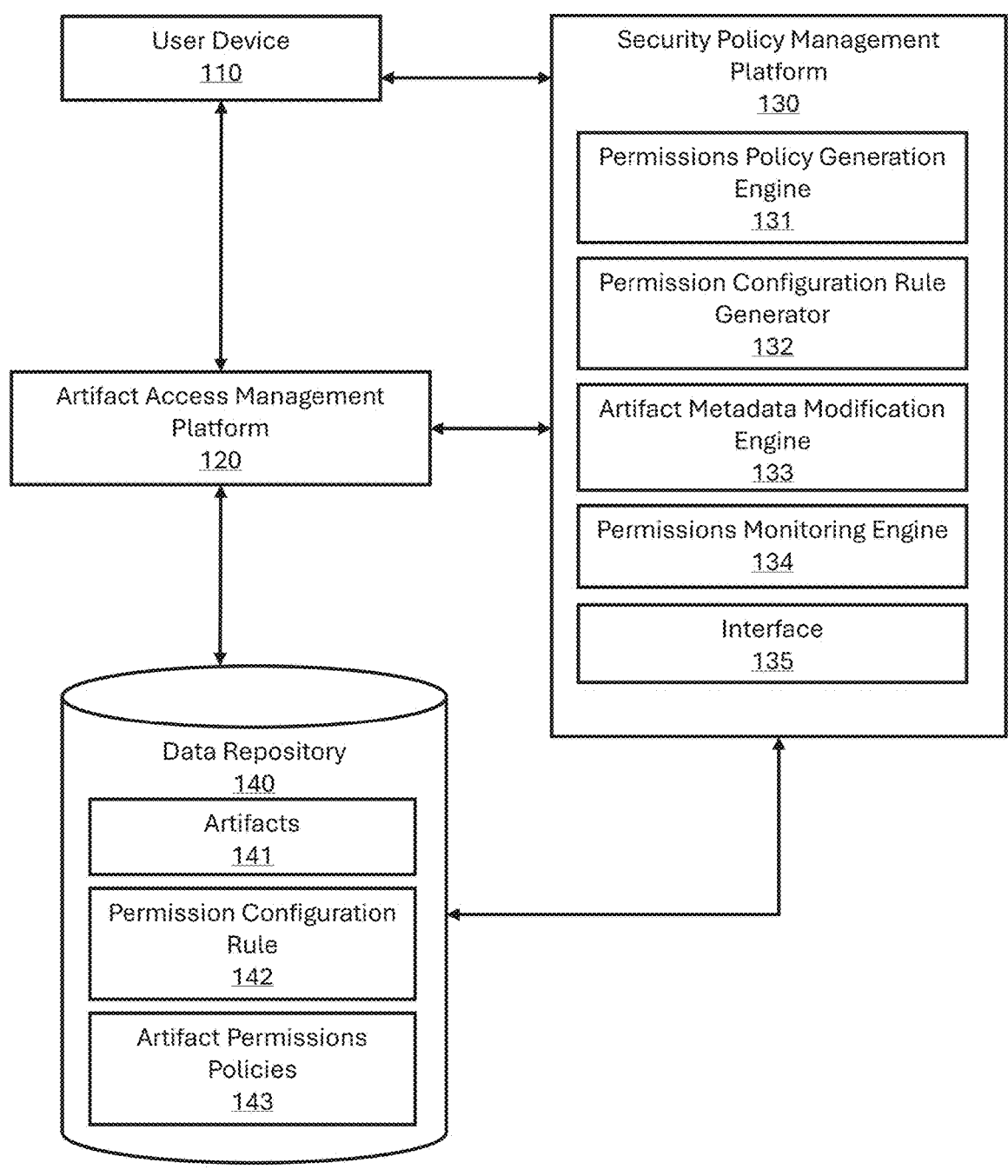
FIG. 1 illustrates a system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. General Overview
2. Permissions Generation Architecture
3. Executing System-Generated Modifications to Permissions Policies Based on User-Defined Permission Rules
4. Generating Permissions Policies Based on Nested Sets of Action/Artifact Pairs
5. Example Embodiment
6. Computer Networks and Cloud Networks
7. Microservice Applications
8. Hardware Overview
9. Miscellaneous; Extensions

1. General Overview

One or more embodiments determine and execute system-generated modifications to permissions for an entity to perform an action on a software artifact based on a user-defined permission configuration rule. The system couples independently configurable permissions based on user-defined permission configuration rules, such that a modification of permissions for performing a first action on a first artifact triggers the modification of permissions for performing a second action on a second artifact. The system executes continuous, periodic, or event-based monitoring of security policies to detect updates to permissions for an entity to perform an action on an artifact. Responsive to detecting the updates, the system executes real-time analysis of the user-defined permission configuration rules to determine if the updates trigger any additional modifications of permissions.

If additional modifications are triggered, the system executes the additional modifications to update security policies in accordance with user-defined permission configuration rules. The system iteratively re-evaluates executed updates to the security policies to determine and execute additional updates until the updates do not trigger additional updates.

In an example, an update that grants permission for an entity to perform a first action on a first artifact results in another update that grants permission for the entity perform a second action on a second artifact. In another example, an update that grants permission for an entity to perform a first action on a first artifact results in another update that removes permission for the entity perform a second action on a second artifact. In another example, an update that removes permission for an entity to perform a first action on a first artifact results in another update that grants permission for the entity perform a second action on a second artifact. In another example, an update that removes permission for an entity to perform a first action on a first artifact results in another update that removes permission for the entity perform a second action on a second artifact.

One or more embodiments generate permissions policies for nested sets of action/software artifact pairs based on a selection of a target action/artifact pair. A system detects a selection of a target action and a target artifact associated with an entity. For example, a security administrator may request that a role, such as "Manager," have permission to edit (e.g., perform an action) a personnel file (e.g., an artifact). The system analyzes metadata of the selected artifact to identify a user-defined permission configuration rule specified in the metadata. The user-defined permission configuration rule may identify one or more additional action/artifact pairs associated with the target action/artifact pair to include in the permissions policy for another entity. For example, the system may identify action/artifact pairs including actions "view," "move," and "delete" as well as artifacts "personnel user interface," "sales," "employees," and "clients" as being associated with the "edit"/"personnel file" action/artifact pair. The system iteratively identifies nested actions/artifacts until a terminating condition is met. The system generates a permissions policy for the entity and the selected action/artifact pair that includes the set of identified nested action/artifact pairs.

One or more embodiments analyze user-defined permission configuration rules specified in permissions metadata in software artifacts to perform the iterative process for identifying nested action/artifact pairs. According to one example, the permissions metadata may include a terminator instruction to end the iterative process corresponding to the artifact being analyzed. For example, a "view"/"invoice" action/artifact may be linked to two additional action/artifact pairs. However, the invoice artifact may include a terminator instruction. When the system detects the terminator instruction in a user-defined permission configuration rule as part of an iterative process for identifying nested action/artifact pairs to include in a permissions policy, the system refrains from including the two additional action/artifact pairs, or any action/artifact pairs downstream from the two pairs, in the permissions policy for the entity and the target action/artifact pair.

One or more embodiments generate permissions policies based on user input associated with software artifacts that specify user-defined permission configuration rules. A user may generate user-defined permission configuration rule data in permissions metadata of a software artifact. The user-defined permission configuration rule data specifies that if a user is granted access to the software artifact, the user is also granted access to an additional software artifact. Access is further defined by the user as one or more actions, as discussed above, including "edit," "view," "move," and "delete." When a system subsequently determines that an entity has been granted access to take the action on the software artifact, the system applies the user-defined permission configuration rule to grant the entity access to the additional software artifact.

One or more embodiments generate permission policies based on applying multiple, different, user-defined permission configuration rules generated by multiple different users for multiple different software artifacts. The resulting permissions policy combines the multiple different permissions specified in the multiple different permissions policies of the multiple different artifacts into a composite permissions policy. For example, one software development team may manage a first software artifact. The software development team generates a user-defined permission configuration rule in the permissions metadata of the software artifact connecting the software artifact to two additional software artifacts. Another software development team may manage one of the additional software artifacts. The latter software development team generates a user-defined permission configuration rule in the additional software artifact to connect the additional software artifact to yet another software artifact. When the system receives a request to grant a user permission to edit one software artifact, the system iteratively (a) identifies the user-defined permission configuration rule in permissions metadata of the software artifact, (b) grants the user access to the additional software artifact, (c) identifies the additional user-defined permission configuration rule in the permissions metadata of the additional software artifact, and (d) grants the user access to the third software artifact. The system generates a permissions policy based on the combined user-defined permission configuration rules specified in the multiple software artifacts.

One or more embodiments described in this Specification and/or recited in the claims may not be included in this General Overview section.

2. Permissions Generation Architecture

FIG. 1 illustrates a system 100 in accordance with one or more embodiments. As illustrated in FIG. 1, system 100 includes a user device 110, an artifact access management platform 120, a security policy management platform 130, and a data repository 140. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository 140 is any type of storage unit and/or device (e.g., a file system, database, collection of tables, or any other storage mechanism) for storing data. Furthermore, a data repository 140 may include multiple different storage units and/or devices. The multiple different storage units and/or devices may or may not be of the same type or located at the same physical site. Furthermore, a data repository 140 may be implemented or executed on the same computing system as the artifact access management platform 120 and the security policy management platform 130. Additionally, or alternatively, a data repository 140 may be implemented or executed on a computing system separate from the artifact access management platform 120 and the security policy management platform 130. The data repository 140 may be communicatively coupled to the artifact access management platform 120 or the security policy management platform 130 via a direct connection or via a network.

Information describing artifacts 141, permission configuration rules 142, and artifact permissions policies 143 may be implemented across any of components within the system 100. However, this information is illustrated within the data repository 140 for purposes of clarity and explanation.

A user device 110 generates requests to the artifact access management platform 120 to access artifacts 141 stored in the data repository 140. In some embodiments, the user device 110 executes applications that process the artifacts. For example, applications may generate user interface elements in a display by executing UI artifacts. As another example, the user device 110 may execute an application to process and display data stored in a data storage artifact. In one or more embodiments, a software artifact is an independently deployable set of software code. Artifacts 141 include software code, executable files, data models, and workflow specifications for initiating workflows in the application that executes the workflow specifications. In some embodiments, the artifact access management platform 120 includes a cloud environment server. The cloud environment server manages access by client devices, including the user device 110 to cloud services and other data stored in the cloud environment.

In one or more embodiments, a tenant (such as tenant utilizing the user device 110) is a corporation, organization, enterprise, or other entity that accesses a shared computing resource such as application artifacts 141. In an embodiment, tenants are independent from each other. A business or operation of one tenant is separate from a business or operation of another tenant.

In some embodiments, the artifact access management platform 120 interfaces with a security policy management platform 130 to determine user permissions to access the artifacts 141. The security policy management platform 130 accesses artifact permissions policies 143 stored in the data repository 140 to determine if a user requesting access to artifacts 141 via the artifact access management platform 120 is permitted to access the artifacts 141. The artifact permissions policies 143 specify users, user types, user roles, devices, and device types that are permitted to access artifacts 141. Permissions 143 may specify one set of artifacts that users and/or devices are permitted to access and another set of artifacts that the users and/or devices are not permitted to access. Permissions 143 may be stored in human-understandable language, in descriptive code or symbols, as a chart or graph, or in any other form ingestible by the artifact access management platform 120 to determine permissions 143 associated with users and/or devices. While the artifact permissions 143 are illustrated in FIG. 1 as being in the same data repository 140 as the artifacts 141, in some embodiments, the system 100 stores the permissions 143 in a data repository accessible by the security policy management platform 130 and not directly connected to the artifact access management platform 120.

The permissions management platform refers to hardware and/or software configured to perform operations described herein for generating and modifying artifact permissions policies. Examples of operations for generating and maintaining artifact permissions policies are described below with reference to FIGS. 2 and 3.

In an embodiment, the security policy management platform 130 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a server, a web server, a network policy server, and a proxy server.

A permissions policy generation engine 131 receives instructions from a user via the user device 110 to generate permissions policies 143 for accessing artifacts 141. In some embodiments, the permissions policy generation engine 131 presents graphical user interface (GUI) data to the user device 110 to display the GUI on a display element of the user device 110. The GUI includes interface elements to specify and modify permissions policies for artifacts.

In one or more embodiments, interface 135 refers to hardware and/or software configured to facilitate communications between the security policy management platform 130 and the user device 110. Interface 135 renders user interface elements and receives input via user interface elements. Examples of interfaces include a GUI, a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 135 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, interface 135 is specified in one or more other languages, such as Java, C, or C++.

In some embodiments, permissions policies 143 specify actions and artifacts 141. Actions specify operations and/or functions that a user or device may apply to an artifact. Actions include, for example, view, modify, generate, move, delete, transform, convert, and combine. Actions may be applied to entire artifacts 141 or subsets of data stored in artifacts 141. According to one example, a user generates a permissions policy by selecting, in a GUI presented in a display of the user device 110, an interface element representing an artifact 141 and an interface element representing an action to be performed on the artifact 141.

A permission configuration rule generator 132 receive instructions from a user via the user device 110 to generate rules. The rules include user-defined permission configuration rules 142. The user-defined permission configuration rules 142 are stored in permissions metadata of software artifacts 141. The user-defined permission configuration rules 142 may include one or more of entity identifiers and action identifiers. For example, one set of user-defined permission configuration rules 142 may specify one set of additional software artifacts 141 associated with a particular entity or type of entity. Another set of user-defined permission configuration rules 142 may specify another set of additional software artifacts 141 associated with a particular action or operation that may be performed on a target software artifact 141 in which the permission metadata is stored.

In one or more embodiments, a user-defined permission configuration rule 142 may identify a particular entity. An entity may include a particular user or a particular group of users. For example, a user-defined permission configuration rule 142 may specify a role in a company or organization. For example, a role "human resources I" may correspond to a particular set of human resources employees that have a particular set of responsibilities. A role "manager" may be associated with another set of employees with another set of responsibilities. A role "administrator" may be associated with yet another set of employees with another set of responsibilities. Additionally, or alternatively, the user-defined permission configuration rule 142 may specify an authorization level. An organization may store a mapping of roles within the organization to authorization levels. A single authorization level may be mapped to one or more roles within the organization.

In one or more embodiments, a user-defined permission configuration rule 142 may be applicable to any entity. A system may determine that the user-defined permission configuration rule 142 is applicable to any entity based on detecting an absence of any entity identifier in the user-defined permission configuration rule 142. Alternatively, the user-defined permission configuration rule 142 may include data specifying that the rule 142 is applicable to any entity. As an example, if the user-defined permission configuration rules 142 include authorization level data to identify groups of entities to which user-defined permission configuration rules 142 apply, an authorization level of zero may indicate that the user-defined permission configuration rule 142 is applicable to any entity.

In one or more embodiments, user-defined permission configuration rules 142 specify dependencies and/or relationships among actions and artifacts 141. User-defined permission configuration rules 142 may specify that if a first permission exists for a user associated with a first artifact, a second permission should exist associated with a second artifact. The second permission may be for the same user or a different user. The second permission may be for the same action associated with the first artifact or for different a different action than the first action. In some embodiments, a rule 142 specifies that if a permission exists for a user associated with an artifact, then a second permission should exist for the user associated with another action and the same artifact.

In one or more embodiments, the permission configuration rule generator 132 receives instructions from a user via the user device 110 to generate permissions configuration rules 142 to configure permissions that associate two or more entities, actions, and artifacts to each other. In some embodiments, the permissions configuration rule generator 132 presents GUI data to the user device 110 to display the GUI on a display element of the user device 110. The GUI includes interface elements to specify and modify permissions configuration rules 142.

In some embodiments, permission configuration rules 142 are stored as metadata in artifacts 141. Upon receiving instructions to generate or modify a permission configuration rule 142 for one or more artifacts 141, an artifact metadata modification engine 133 accesses the one or more artifacts 141 to modify metadata stored in the artifact(s) based on the generated or modified permission configuration rule 142.

A permissions monitoring engine 134 monitors, in real-time, updates to security policies associated with permissions for executing actions in one or more artifacts 141. The permissions monitoring engine 134 monitors the software artifacts 141 to detect additions to, deletions from, and modifications to permissions metadata associated with software artifacts 141. The permissions metadata includes permission configuration rules 142 stored as metadata in the software artifacts 141. For example, if a user modifies a permission policy 143 for a software artifact 141 via a GUI presented by a permissions policy generation engine 131, the permissions monitoring engine 134 determines if the modification triggers a permission configuration rule 142 to add or remove permissions to an additional action/artifact pair based on access permissions associated with the target artifact 141. As another example, if a user modifies a permission configuration rule 142 for a software artifact 141 via a GUI presented by the permission configuration rule generator 132, the permissions monitoring engine 134 determines if the modification triggers a modification to any other permission configuration rule 142 to add or remove permissions to/from an additional action/artifact pair based on access permissions associated with the target artifact 141.

The permissions policy generation engine 131 performs an iterative process to modify permission policies based on a modification to one or both of a permission policy 143 associated with an artifact 141 and a permission configuration rule 142 associated with an artifact 141. For example, a user may modify a user-defined permission configuration rule 142 for an artifact to specify another action/artifact pair that was not previously specified in the user-defined permission configuration rules 142. The permission policy generation engine 131 (a) modifies the artifact permission policy 143 to include the newly-identified action/artifact pair, and (b) analyzes permission configuration rule 142 for the newly-identified action/artifact pair. If a permission configuration rule 142 for the newly-identified action/artifact pair specifies yet another action/artifact pair that should be included in a permission policy 143, the permission policy generation engine 131 modifies the permission policy 143 to include the additional action/artifact pair. The permission policy generation engine 131 iteratively repeats the permission policy modification and addition of action/artifact pairs until no further action/artifact pairs are identified in permission configuration rule 142 of artifacts 141 specified in an artifact permission policy 143.

In one or more embodiments, a user specifies an initial action/artifact pair in a user-specified permission policy 143 and/or permission configuration rule 142. The permission policy generation engine 131 subsequently performs a system-executed recursive process of modifying a permission policy 143 to include additional action/artifact pairs based on the initial action/artifact pair specified by the user. The system-executed recursive process may be an automated process that does not require human intervention. The system-executed recursive process includes the analysis of artifact metadata, the modification of permissions policies based on the artifact metadata, and the identification of additional artifacts based on the modified permissions policies. The permission policy generation engine 131 stores the resulting artifact permission policy 143, including permissions specifying a user-specified artifact and one or more system-identified artifacts, based on the permissions policy generation engine 131 implementing permission configuration rules 142. When a user requests access to an artifact 141 via the user device 110, the artifact access management platform 120 analyzes the corresponding permission policy

143 to determine (a) whether or not to grant the user permission to the artifact and (b) any additional artifacts the user is entitled to access.

Figure 2:
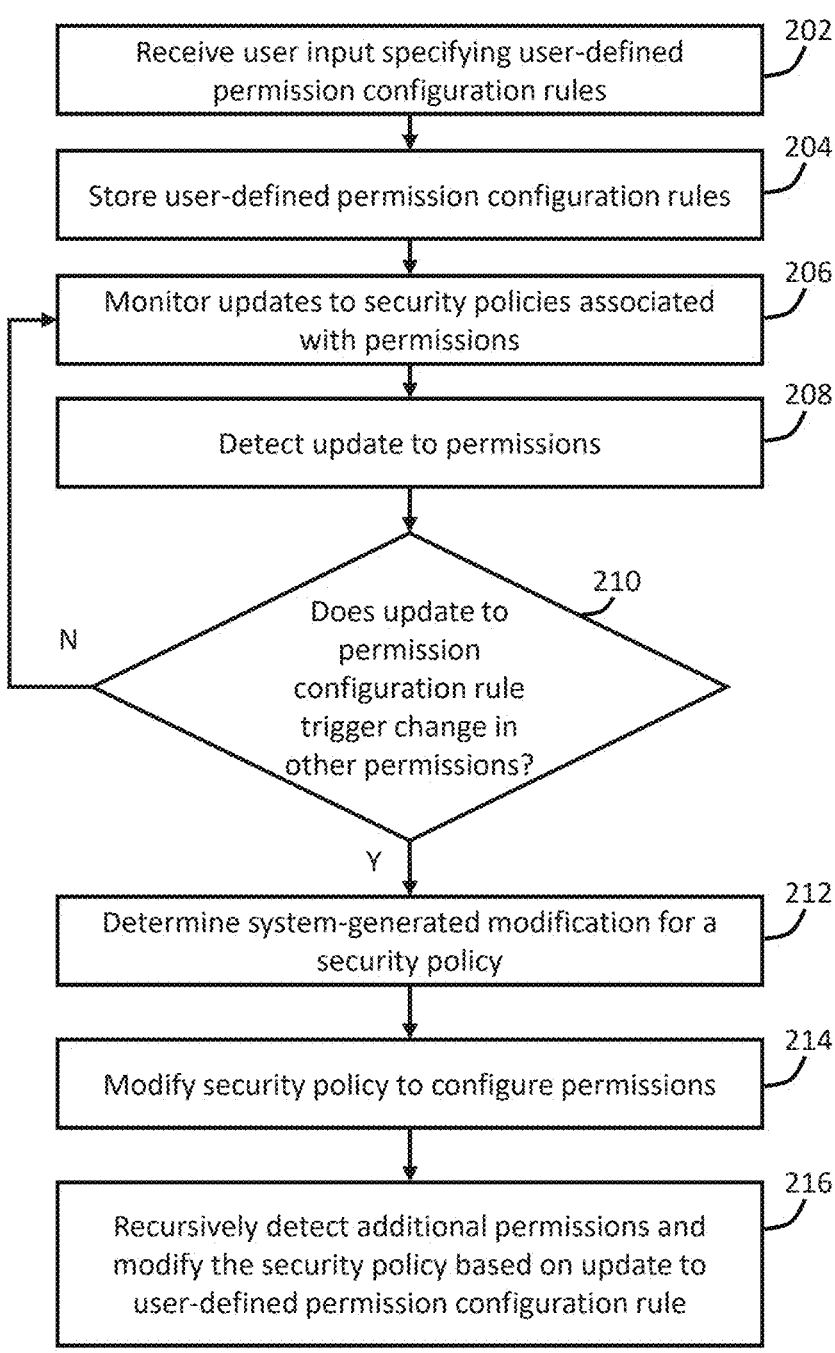
FIG. 2 is a flow diagram illustrating operations for modifying a security policy for an entity based on detecting a modification to user-defined permission configuration rules associated with the entity and an action/artifact pair according to one or more embodiments.

3. Executing System-Generated Modifications to Permissions Policies Based on User-Defined Permission Rules FIG. 2 illustrates an example set of operations for generating permission policies based on nested sets of action/artifact pairs in accordance with one or more embodiments. One or more operations illustrated in FIG. 2 may be modified, rearranged, or omitted. Accordingly, the particular sequence of operations illustrated in FIG. 2 should not be construed as limiting the scope of one or more embodiments.

A system receives a user input specifying one or more user-defined permission configuration rules that modify permissions associated with at least one action/artifact pair (Operation 202). The user-defined permission configuration rules may be stored in permissions metadata of a software artifact. An artifact points to a software module or component. An example includes a user interface (UI) software component that points to a UI for a set of display data. According to one example, within an organization, one programming team may generate and/or maintain an "Invoice" UI. Another programming team may generate and/or maintain a "Client" UI. Yet another programming team may generate and/or maintain a "Personnel" UI. Additional types of artifacts include data object artifacts and metadata object artifacts. Data object artifacts include, for example, digital files that store data to be presented in a UI. Data refers to the content, variables, values, and information that is being stored, processed, transmitted, and displayed by software code. It represents the substance of what is being communicated or analyzed, such as text, numbers, images, or other forms of structured or unstructured information. Metadata is a type of data that describes other data. While a user interface may display values for an invoice, the system may store additional information about the invoice that the system does not display. The additional information may include, for example, identifiers of related invoices and security information associated with the invoice file. The metadata provides context, structure, and attributes that facilitate organization, management, and understanding of the data. Metadata includes various details, like creation date, authorship, file format, and relationships between pieces of data, that enhance efficiency in data retrieval, usage, and maintenance across various systems and applications. In one or more embodiments, artifacts, including UI artifacts and data object artifacts, store permissions metadata.

The user-defined permission configuration rules stored in permissions metadata of software artifacts may include one or more of entity identifiers and action identifiers. For example, one set of user-defined permission configuration rules may specify one set of additional software artifacts associated with a particular entity or type of entity. Another set of user-defined permission configuration rules may specify another set of additional software artifacts associated with a particular action or operation that may be performed on a target software artifact in which the permission metadata is stored.

In one or more embodiments, a user-defined permission configuration rule may identify a particular entity. An entity may include a particular user or a particular group of users. For example, a user-defined permission configuration rule may specify a role in a company or organization. For example, a role "human resources I" may correspond to a particular set of human resources employees that have a particular set of responsibilities. A role "manager" may be associated with another set of employees with another set of responsibilities. A role "administrator" may be associated with yet another set of employees with another set of responsibilities. Additionally, or alternatively, the user-defined permission configuration rule may specify an authorization level. An organization may store a mapping of roles within the organization to authorization levels. A single authorization level may be mapped to one or more roles within the organization.

In one or more embodiments, a user-defined permission configuration rule may be applicable to any entity. A system may determine that the user-defined permission configuration rule is applicable to any entity based on detecting an absence of any entity identifier in the user-defined permission configuration rule. Alternatively, the user-defined permission configuration rule may include data specifying that the rule is applicable to any entity. As an example, if the user-defined permission configuration rules include authorization level data to identify groups of entities to which user-defined permission configuration rules apply, an authorization level of zero may indicate that the user-defined permission configuration rule is applicable to any entity.

In one or more embodiments, the system detects that the user input specifies user-defined permission configuration rules that modify permissions for an entity to perform actions on one set of artifacts based on updates to permissions for the entity to perform actions on another set of artifacts. For example, a user-defined permission configuration rule may specify that if an entity has permission to perform a first action on a first artifact, the entity also has permission to perform a second action on a second artifact.

The system stores the user-defined permission configuration rules for use in an automated modification of security policies (Operation 204). In one embodiment, the system stores the user-defined permission configuration rules associated with software artifacts. The software artifacts may be the same software artifacts that are the object of the permissions. For example, a set of rules specifying (a) one set of actions and artifacts to be implemented based on permissions to (b) another set of actions and a target artifact, (c) may be stored in the target artifact.

The system monitors, in real-time, updates to security policies associated with permissions for executing actions in one or more artifacts (Operation 206). According to one example, a security policy generation platform monitors user activity to generate and modify permissions metadata associated with software artifacts. The monitoring may be a continuous monitoring of the software artifacts. For example, the platform may provide a user interface (UI) that allows users to modify permissions metadata in software artifacts. When a user makes a modification to the permissions metadata in a target artifact, the system determines if the modification triggers a modification to a permission configuration rule to add or remove permissions to an additional action/artifact pair based on access permissions associated with the target artifact.

According to another example, the system periodically queries a database storing artifacts to determine if modifications have been made to user-defined permission configuration rules. When a user modifies permission configuration rules, the system may store a value, such as a "modification" flag, in a database record. The system may periodically query the database records to identify the artifacts that correspond to changes in permission configuration rules.

The system may identify software artifacts that have had permission configuration rules modified by initiating a "pull-type" query on a set of data such as data stored in a database. In one or more embodiments, the pull-type operation is initiated based on an application programming interface (API) request. A system may make a request to an API endpoint to fetch data specifying the user-defined permission configuration rules maintained by an application associated with the API that have been modified. The application may be, for example, a web application, a mobile application, or another software service. The system pulls the requested data from the API based on the request.

According to one example, the system pulls permission configuration rules modification data from a message queue or an event stream in a distributed system. For example, a data producer in a distributed system may generate permission configuration rule modification messages and send them to an event stream. The event streams are utilized to provide real-time communication within the distributed system. The event streams may transmit records of events within the distributed system, such as data requests and responses. The message queues and event streams may be implemented in a microservices environment to allow microservices to communicate asynchronously. A data consumer device may store the event stream in a message queue. The data consumer device may pull permission configuration rule modification messages from the message queue when the data consumer device is ready to process the messages. For example, the data consumer device may pull the permission configuration rule modification messages from the message queue at regular intervals, such as hourly, daily, or weekly. Additionally, or alternatively, the data consumer device may pull the permission configuration rule modification messages from the message queue based on processing bandwidth availability or message priority.

According to yet another example, the system pushes permission configuration rules modification data from an application or device that detects a modification to an application or device that monitors, uses, or implements permission configuration rules. For example, a system may include one application that manages the storage and access of software artifacts. The system may include another application that manages generation and modification of software artifacts. The system may include yet another application that manages the granting of user permissions to access software artifacts. When the application that manages the modification of software artifacts detects a change to permission configuration rules, the application may transmit a notification of the modification to the application that manages the granting of user permissions to access software artifacts. According to one example embodiment, the system implements the push-type data transmission operations in a publish-subscribe system architecture. An application that manages modifications to data artifacts may push messages to a central broker or message bus. The central broker may then distribute these messages to any applications that are subscribed consumers of the modifications messages.

Based on the real-time monitoring, the system detects an update to permissions for a first entity to execute a first action on a first artifact (Operation 208). For example, a system may receive a notification from an artifact management application that a user modified permission configuration rules. Additionally, or alternatively, a system may query database records associated with permission configuration rules to identify modifications to the permission configuration rules.

The system determines if any user-defined permission configuration rule triggers a change in other permissions based on the update to permissions (Operation 210). For example, the update to a user-defined permission configuration rule may specify an action/artifact pair that was not previously specified in the user-defined permission configuration rules. For example, the update may specify a new artifact and a new set of one or more actions associated with the artifact. Additionally, or alternatively, the update may specify a new action associated with an artifact that was previously included in the user-defined permission configuration rules. Additionally, or alternatively, the update may specify a new entity associated with a newly-specified artifact and/or a newly-specified action. According to another example, the new entity may be associated with an artifact that was previously included in the user-defined permission configuration rules or with an action that was previously specified in the user-defined permission configuration rules. Additionally, or alternatively, the update may remove a previously specified permission for a previously specified entity. For example, a set of permissions metadata may be modified to omit an entity from among a set of entities specified to be given permission to access a target artifact.

Based on the user-defined permission configuration rules and the update to the permissions, the system determines a system-generated modification for a security policy (Operation 212). For example, if the system determines that a user has modified permissions metadata in a software artifact to specify a new user that has access to the software artifact, the system determines a system-generated modification to a security policy for the new user to give the new user access to the software artifact and any additional software artifacts specified in the permissions metadata for the artifact. For example, permissions metadata for a first artifact may specify a set of actions associated with a second artifact. The permissions metadata may specify that any entity with access to the first artifact may be given permissions to access the second artifact. Based on the update to user-generated permissions configuration rules in the permissions metadata in the first artifact to include a first entity, the system determines that a security policy associated with the first entity and the first artifact should be modified to include permissions associated with the second artifact. As discussed above, access to a software artifact may include one or more actions, including viewing data in a software artifact, viewing metadata of the artifact, editing data and/or metadata of the artifact, and deleting the artifact.

Based on the system-generated modification, the system modifies, in real-time, the security policy (Operation 214). In the example embodiment in which the system detects an update to a user-defined configuration rule to include a second action/artifact pair associated with a first action/artifact pair and a particular user, the system modifies the security policy associated with the user in real-time to include the second action/artifact pair. The system may store the security policy in a security module of a platform or in a security application. The security module or application may be different from a module or application that manages the creation and modification of software artifacts. For example, a microservices environment may include a first microservice that manages creating, deleting, and modifying data objects in a database. The microservices environment may include a second microservice for managing user interfaces. The microservices environment may include a third microservice for managing security settings and user access to other microservices. Accordingly, the third microservice may store the modified security for a particular user to access software artifacts maintained by one or both of the first and second microservices.

The system recursively modifies additional permissions based on the user-defined permission configuration rules (Operation 216). For example, a system may identify an update to a user-defined permission configuration rule associated with a first software artifact to give a first user permission to perform a first action associated with the first software artifact. The system may further identify one or more additional user-defined permission configuration rules associated with the same first software artifact. For example, the system may identify a user-defined permission configuration rule indicating that users with access to perform the first action on the first artifact should be given permission to perform a second action on a second artifact. As an example, the first artifact may be a user interface (UI), and the second artifact may be a data object stored in a database that may be viewed and edited in the UI. The system modifies a security policy to include permissions for the user to perform the first action on the first artifact and the second action on the second artifact (as described above in Operation 214). The system further analyzes the permissions metadata associated with the second artifact to identify two additional user-defined permission configuration rules. The rules may specify that a user with access to the second artifact should be given permission to perform a third action on a third artifact and a fourth action on a fourth artifact. For example, the third and fourth artifacts may be data objects stored in a database. The actions may include "retrieve data" actions that allow the user to populate a representation of the second data object in the UI with values stored in the third and fourth artifacts. Accordingly, the system recursively modifies the security policy with the additional permissions identified in the permissions data associated with the second artifact. The system recursively analyzes permissions data and modifies the security policy for each artifact until a termination condition is detected. A termination condition may include a value indicating that a particular artifact is an endpoint for the recursive analysis. Additionally, or alternatively, the termination condition may be that the system detects in an artifact no additional user-defined permission configuration rules to give an entity any additional permissions associated with any additional actions and/or artifacts.

4. Generating Permission Policies Based on Nested Sets of Action/Artifact Pairs FIG. 3 illustrates an example set of operations for generating permission policies based on nested sets of action/artifact pairs in accordance with one or more embodiments. One or more operations illustrated in FIG. 3 may be modified, rearranged, or omitted. Accordingly, the particular sequence of operations illustrated in FIG. 3 should not be construed as limiting the scope of one or more embodiments.

A system detects a user input specifying an entity and a target action/artifact pair (Operation 302). An entity includes any user, organization, group, or role. For example, the input may specify the role "Supervisor." The system may associate the target action/artifact pair with any user with the role "supervisor" in an organization. Additionally, or alternatively, the entity may include a single user. For example, a security administrator may generate a user input that specifies a name "Mary Jay." The system may associate the action/artifact pair with the individual "Mary Jay." The permissions metadata identifies additional artifacts linked to a particular artifact. When an entity receives a permission to perform an action associated with a target artifact, the system further provides the entity with additional permissions to perform additional actions on the additional artifacts identified in the permissions metadata of the target artifact.

The system generates permissions policy data specifying the entity and the target action/artifact pair (Operation 304). The system may access permissions policy files to determine when users are permitted to perform actions associated with artifacts. For example, a permissions policy may include the following data: UserA is permitted to perform ActionB on ArtifactC. Additionally, or alternatively, a permissions policy may specify a role rather than a particular user. As an example, a permissions policy may include the following: Users in RoleD are permitted to perform ActionB on ArtifactC. The permissions policy may be a digitally stored file.

The system analyzes permission metadata in the target artifact to determine if the metadata includes permissions associated with one or more action/artifact pairs (Operation 306). Target artifacts are data structures that may store both data and metadata. As discussed above, data refers to the content, variables, values, and information that is being stored, processed, transmitted, and displayed by software code. It represents the substance of what is being communicated or analyzed, such as text, numbers, images, or other forms of structured or unstructured information. Metadata is a type of data that describes other data. The metadata provides context, structure, and attributes that facilitate organization, management, and understanding of the data. Metadata includes details like creation date, authorship, file format, and relationships between pieces of data, enhancing efficiency in data retrieval, usage, and maintenance across various systems and applications.

The permission metadata indicates if there are any additional action/artifact pairs associated with the target artifact and one or more actions paired with the target artifact. For example, an action/artifact pair to "view" (action) a user interface (artifact) may be associated with permissions to view one set of action/artifact pairs. A specified action/artifact pair may include an action to access (action) data in an Opportunities data object (artifact). Another action/artifact pair associated with the target artifact may include an action to "edit" the artifact (e.g., a user interface or data object). The edit/UI action/artifact pair may be associated with a different set of permissions metadata than the view/UI action/artifact pair. For example, the edit/UI pair may be associated with a set of actions "add entry"/"Invoices", "delete entry"/"Invoices", "modify entry"/"Invoices", and "view entry"/"Invoices". The set of actions may further be associated with additional data objects, such as "Accounts," "Personnel," "Customers," and "Opportunities."

For example, a Customer-type data object may store customer data. Data attributes include Customer Name, Origination Date, Customer Location, Principal Contact, Industry, etc. Permissions metadata associated with the Customer data object may specify a View/Products action/artifact pair and an Edit/Accounts action/artifact pair. The system may determine that an entity granted permission to edit the Customer data object should also be granted permission to view product data in Product data objects and to edit account data in Accounts artifacts.

If the metadata does not include permissions associated with one or more action/artifact pairs, the system stores a permissions policy associated with the entity and the target action/artifact pair (Operation 308). The system may store a digital file that is accessed when the entity initiates a request to perform an action on an artifact. The system determines whether or not to allow the entity to perform the action on the artifact based on the stored permissions policy.

If the permissions metadata includes one or more additional action/artifact pairs, the system updates the permissions policy data for the entity and the target action/artifact pair to include permissions associated with the additional action/artifact pairs (Operation 310). As discussed in an example above, permissions metadata associated with a Customer data object may specify a View/Products action/artifact pair and an Edit/Accounts action/artifact pair. The system may determine that an entity granted permission to edit the Customer data object should also be granted permission to view product data in Product data objects and to edit account data in Accounts artifacts. Accordingly, the system updates the permissions policy associated with an entity and an Edit/Customer action/artifact pair to include the View/Products action/artifact pair and an Edit/Accounts action/artifact pair.

The system analyzes additional permissions metadata in an additional artifact (Operation 312). Referring to the example above in which the Customer data object specifies a View/Products action/artifact pair and an Edit/Accounts action/artifact pair, the system analyzes the permissions metadata in the Products data object and the Accounts data object. The system may identify one or more additional action/artifact pairs in one or both of the Products data object and the Accounts data object. For example, the permissions metadata in the Accounts data object may specify an Edit/ClientOpportunity action/artifact pair associated with the Edit/Accounts action/artifact pair. In one or more embodiments, different action/artifact pairs may be associated with different actions. For example, the permissions metadata may specify that an Edit/ClientOpportunity action/artifact pair is associated with an Edit/Accounts action/artifact pair and not associated with a View/Accounts action/artifact pair. The edit action on Accounts may give an entity permission to edit artifacts. The view action on Products may give an entity permission to view data in artifacts without editing data in the artifacts.

The system determines if the additional permissions metadata includes a process terminator (Operation 314). A process terminator may include a data element that directs the system to end an iterative process of identifying additional action/artifact pairs for a permissions policy. The process terminator may include a flag that is set or cleared or a specific word or set of words stored in a particular location. For example, a permissions policy portion of an artifact may include a field representing "permission type." If the permission type is "permission group," the system may continue to iteratively identify additional action/artifact pairs to include in a permissions policy. If the permission type is "permission," the system may halt the iterative process of identifying additional action/artifact pairs to include in the permissions policy.

In one or more embodiments, permissions metadata may specify additional action/artifact pairs for one set of actions associated with an artifact and may include a process terminator associated with another set of actions associated with the artifact. For example, a "View" type action may be associated with a process terminator in the permissions metadata. An "Edit" type action may be associated with an additional action/artifact pair to include in a permissions policy. Additionally, or alternatively, the permissions metadata may specify additional action/artifact pairs for one entity and may include a process terminator associated with another entity. For example, the permissions metadata in an Employee artifact may specify that an entity with a Level0 authorization level corresponds to a process terminator for a View/Employee action/artifact pair. The permissions metadata may specify that an entity with a Level1 authorization level corresponds to an additional action/artifact pair (e.g., Edit/Team) for the View/Employee action/artifact pair.

If the permissions metadata does not include a process terminator, the system determines if the permissions metadata includes permissions associated with one or more action/artifact pairs (Operation 316). As discussed above in connection with Operation 304, artifacts include data and metadata. The permissions metadata may specify one or more additional artifacts associated with a target artifact. The permissions metadata may further specify one or more additional actions associated with additional artifacts and with the action/artifact pair.

If the metadata include permissions associated with target action/artifact pair, the system updates the permissions policy to include permissions associated with the additional action/artifact pairs (Operation 318). The system iteratively performs Operations 312, 314, 316, and 318 until every analyzed set of permissions metadata either (a) includes a process terminator or (b) does not specify additional action/artifact pairs.

If the metadata does not include permissions associated with one or more action/artifact pairs, the system stores the permissions policy associated with the target action/artifact pair (Operation 320). The permissions policy specifies (a) an entity and (b) a set action/artifact pairs that the entity is authorized to access and perform.

5. Example Embodiment

A detailed example is described below for purposes of clarity. Components and/or operations described below should be understood as one specific example that may not be applicable to certain embodiments. Accordingly, components and/or operations described below should not be construed as limiting the scope of any of the claims.

Figure 4:
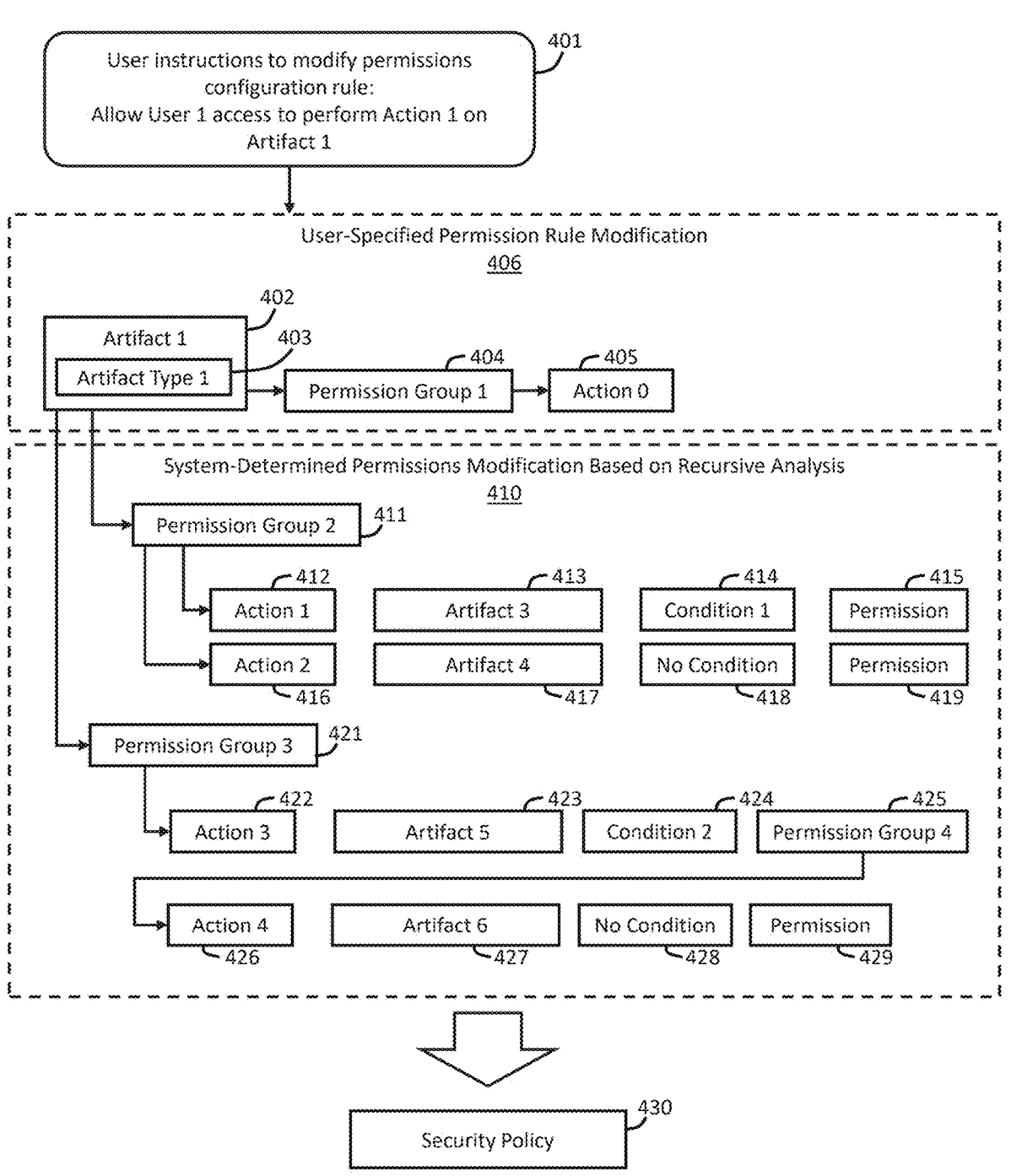
FIG. 4 illustrates an example embodiment of initiating a recursive system-executed analysis of permissions policies to generate or modify a security policy based on detecting a modification to a permission policy configuration rule associated with a software artifact.

FIG. 4 illustrates an example process for initiating a system-based recursive process from a user-specified instruction to modify a permissions policy rule for a software artifact. A user generates an instruction 401 to generate a user-specified permission rule modification 406. The rule specifies that if a user is granted a set of permissions specified by permission group 1 (404), the user is granted permission to perform an action (Action 0) 405 on an artifact (Artifact 1) 402. The designation of the permissions as a "permission group" instructs the system to initiate a recursive process to identify additional permissions for any additional action/artifact pairs. In contrast, designating the permissions as "permission" instructs the system to refrain from initiating or continuing a recursive process to identify additional action/artifact pairs.

The system monitors artifact metadata in real-time to determine whether to generate or update security policies. Accordingly, the system detects the user modification of the user-specified permission rule modification 406. Based on the modification of the permission policy configuration rule to grant access to the action/artifact pair Action 0/Artifact 1 and the indication that the permission is a permission group 404, the system initiates a recursive process to identify additional action/artifact pairs to include in a new or modified security policy 430.

The system determines that Artifact 1 (402) is of an Artifact Type 1 (403). The system determines that Artifact Type 1 (403) is associated with an additional set of permissions, Permission Group 2 (411). Permission Group 2 (411)

grants permission to perform Action 1 (412) on Artifact 3 (413) if a condition, Condition 1 (414), is met. As an example, Condition 1 may be a particular authorization level. The system may determine if a requesting user has an authorization level exceeding a threshold. The action/artifact pair, Action 1 (412)/Artifact 3 (413), is associated with a Permission designation 415. Accordingly, the system refrains from performing an additional recursive analysis to determine if additional permissions are derived from the action/artifact pair, Action 1 (412)/Artifact 3 (413). Permission Group 2 (411) further grants permission to perform Action 2 (416) on Artifact 4 (417) without conditions, "No Condition" (418). The action/artifact pair, Action 2 (416)/ Artifact 4 (417), is associated with a Permission designation 419. Accordingly, the system refrains from performing an additional recursive analysis to determine if additional permissions are derived from the action/artifact pair, Action 2 (416)/Artifact 4 (417).

In addition to the permissions derived from the Permission Group 2 (411), the system determines that additional permissions, Permission Group 3 (421), are derived from the action/artifact pair Action 0 (405)/Artifact 1 (402). Permission Group 3 (421) grants permission to perform Action 3 (422) on Artifact 5 (423) if a condition, Condition 2 (424), is met. As an example, Condition 2 may be determining if a requesting user has a particular role in an organizational hierarchy. The action/artifact pair, Action 3 (422)/Artifact 5 (423) are associated with a Permission Group designation, Permission Group 4 (425). Accordingly, the system performs an additional recursive analysis to determine if additional permissions are derived from the action/artifact pair, Action 3 (422)/Artifact 5 (423). Permission Group 4 (425) further grants permission to perform Action 4 (426) on Artifact 6 (427) without conditions, "No Condition" (428). The action/artifact pair, Action 4 (426)/Artifact 6 (427), is associated with a Permission designation 429. Accordingly, the system refrains from performing an additional recursive analysis to determine if additional permissions are derived from the action/artifact pair, Action 4 (426)/Artifact 6 (427).

Based on the combined user-specified permission policy rule modification 406 and the system-determined permissions modification 410 based on recursive policy permissions analysis, the system generates a security policy 430. The security policy 430 specifies the action artifact pairs and conditions specified in the user-specified permission policy rule modification 406 and the system-determined permissions modifications 410.

Figure 5:
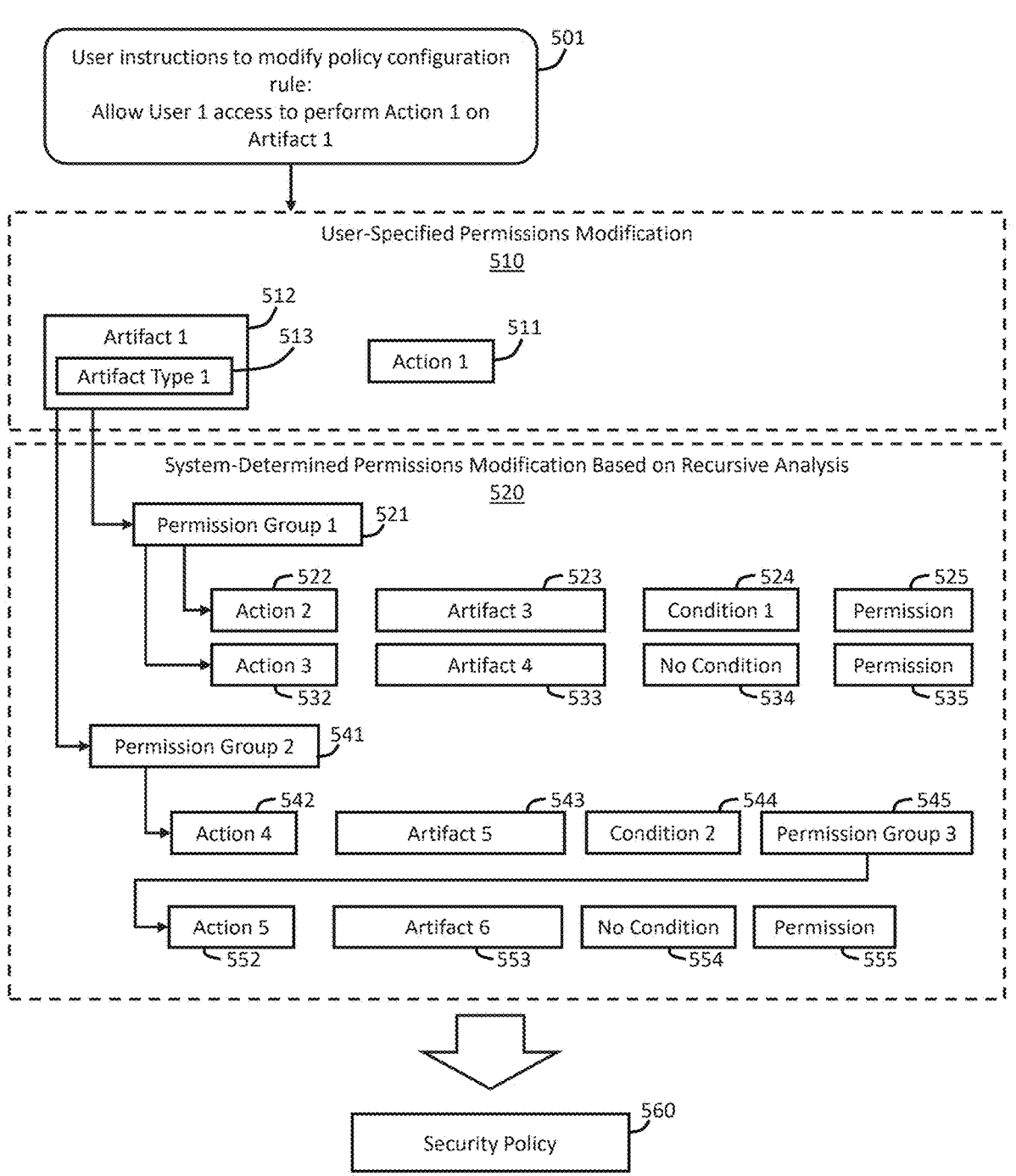
FIG. 5 illustrates an example embodiment initiating a recursive system-executed analysis of permissions policies to generate or modify a security policy based on detecting a modification to a permission policy associated with a software artifact.

FIG. 5 illustrates an example process for initiating a system-based recursive process from a user-specified instruction to modify a permission policy for a software artifact. A user generates an instruction 501 to grant access to User 1 to perform Action 1 (511) on Artifact 1 (512).

Based on the modification of the permission policy to grant User 1 access to perform Action 1 (511) on Artifact 1 (512), the system initiates a recursive process to identify additional action/artifact pairs to include in a new or modified security policy 560.

The system determines that Artifact 1 (512) is of an Artifact Type 1 (513). The system determines that Artifact Type 1 (513) is associated with an additional set of permissions, Permission Group 1 (521). Permission Group 1 (521) grants permission to perform Action 2 (522) on Artifact 3 (523) if a condition, Condition 1 (524), is met. As an example, Condition 1 may be a particular authorization level. The system may determine whether a requesting user has an authorization level exceeding a threshold. The action/ artifact pair, Action 2 (522)/Artifact 3 (523), is associated with a Permission designation 525. Accordingly, the system refrains from performing an additional recursive analysis to determine if additional permissions are derived from the action/artifact pair, Action 2 (522)/Artifact 3 (523). Permission Group 1 (521) further grants permission to perform Action 3 (532) on Artifact 4 (533) without conditions, "No Condition" (534). The action/artifact pair, Action 3 (532)/ Artifact 4 (533), is associated with a Permission designation 535. Accordingly, the system refrains from performing an additional recursive analysis to determine if additional permissions are derived from the action/artifact pair, Action 3 (532)/Artifact 4 (533).

In addition to the permissions derived from the Permission Group 1 (521), the system determines that additional permissions, Permission Group 2 (541), are derived from the action/artifact pair Action 1 (511)/Artifact 1 (512). Permission Group 2 (541) grants permission to perform Action 4 (542) on Artifact 5 (543) if a condition, Condition 2 (544), is met. As an example, Condition 2 may be determining that a requesting user has a particular role in an organizational hierarchy. The action/artifact pair, Action 4 (542)/Artifact 5 (543), is associated with a Permission Group designation, Permission Group 3 (545). Accordingly, the system performs an additional recursive analysis to determine if additional permissions are derived from the action/artifact pair, Action 4 (542)/Artifact 5 (543). Permission Group 3 (545) further grants permission to perform Action 5 (552) on Artifact 6 (553) without conditions, "No Condition" (554). The action/artifact pair, Action 5 (552)/Artifact 6 (553), is associated with a Permission designation 555. Accordingly, the system refrains from performing an additional recursive analysis to determine if additional permissions are derived from the action/artifact pair, Action 5 (552)/Artifact 6 (553).

Based on the combined user-specified permissions modification 510 and the system-determined permissions modification 520, based on recursive policy permissions analysis, the system generates a security policy 560. The security policy 560 specifies the action/artifact pairs and conditions specified in the user-specified permissions modification 510 and the system-determined permissions modification 520.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may additionally, or alternatively, provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other.

These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally, or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
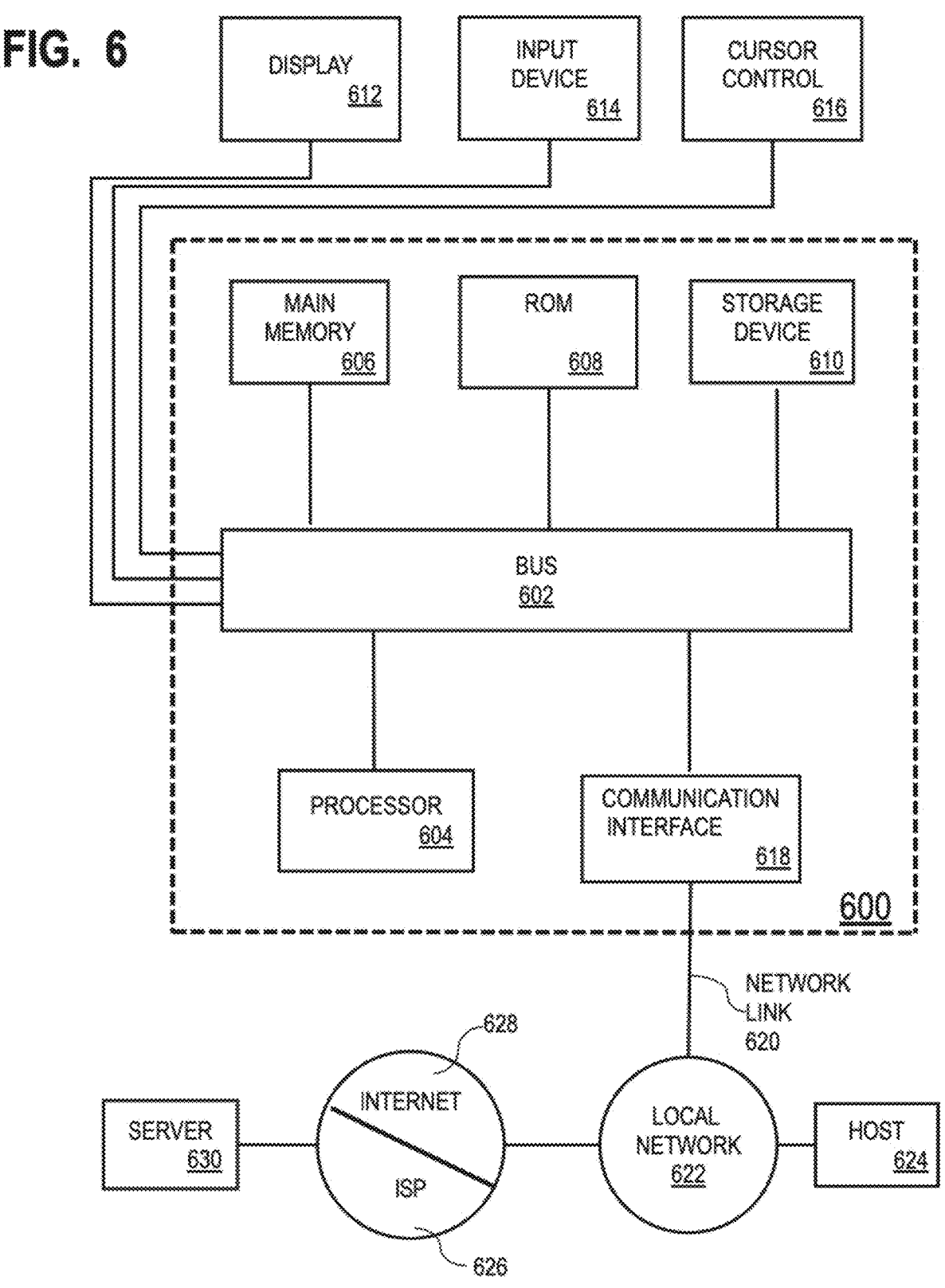
FIG. 6 shows a block diagram that illustrates a computer system in accordance with one or more embodiments.

For example, FIG. 6 is a block diagram that illustrates a computer system 600 upon which an embodiment of the disclosure may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or a Solid-State Drive (SSD) is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

9. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:

receiving user input comprising a user-defined permission configuration rule that (a) configures permissions for one or more entities to execute a first action on a first artifact based on (b) updates to permissions for the one or more entities to execute a second action on a second artifact;

detecting an update to permissions for a first entity to execute the second action on the second artifact;

based on the user-defined permission configuration rule and the update to the permissions for the first entity to execute the second action on the second artifact, determining a system-generated modification for a security policy to configure permissions for the first entity to execute the first action on the first artifact;

executing the system-generated modification for the security policy to generate an updated security policy;

receiving, from the first entity, a request to execute the first action on the first artifact; and granting or rejecting the request based on the updated security policy.

2. The one or more non-transitory computer readable media of claim 1, wherein the operations further comprise:

monitoring any updates to the security policy to detect the update to the permissions for the first entity to execute the second action on the second artifact.

3. The one or more non-transitory computer readable media of claim 2, wherein the operations further comprise:

storing metadata specifying a set of permission configuration rules for a set of action/artifact pairs, the set of permission configuration rules including the user-defined permission configuration rule for the second action and the second artifact, wherein monitoring any updates to the security policy includes monitoring the metadata to determine whether changes to the metadata correspond to modifications to one or more permission configuration rules.

4. The one or more non-transitory computer readable media of claim 1, wherein detecting the update to the permissions for the first entity to execute the second action on the second artifact comprises detecting that permission has been granted for the first entity to execute the second action on the second artifact, and wherein the system-generated modification comprises modifying the security policy to grant permission for the first entity to execute the second action on the second artifact.

5. The one or more non-transitory computer readable media of claim 1, wherein detecting the update to the permissions for the first entity to execute the second action on the second artifact comprises detecting that permission has been granted for the first entity to execute the second action on the second artifact, and wherein the system-generated modification comprises modifying the security policy to remove permission for the first entity to execute the second action on the second artifact.

6. The one or more non-transitory computer readable media of claim 1, wherein the operations further comprise iteratively updating the security policy at least by:

receiving a second user input defining a second user-defined permission configuration rule that triggers (a) permission for an entity to execute a third action on a third artifact based on (b) the entity being granted permission to execute the first action on the first artifact; and responsive to: (a) the second user input defining the second user-defined permission configuration rule, and (b) detecting that the security policy has been updated to grant the first entity permission to execute the first action on the first artifact: updating the security policy to grant the first entity permission to execute the third action on the third artifact.

7. The one or more non-transitory computer readable media of claim 1, wherein the operations further comprise:

receiving a second user input defining a second user-defined permission configuration rule that triggers (a) permissions for entities to execute a third action on a third artifact based on (b) the entities being explicitly granted permission via user input to execute the first action on the first artifact;

detecting that the security policy has been updated by application of the user-defined permission configuration rule to grant the first entity permission to execute the first action on the first artifact; and refraining from updating the security policy to grant the first entity permission to execute the third action on the third artifact based on at least one of: (a) the permission to perform the first action on the first artifact was granted by the user-defined permission configuration rule or (b) permission to perform the first action on the first artifact was not explicitly granted via any user input.

8. The one or more non-transitory computer readable media of claim 1, wherein the operations further comprise:

determining a permission type associated with the first action and the first artifact; and based on (a) the permission type, and (b) detecting that the security policy has been updated by application of the user-defined permission configuration rule to grant the first entity permission to execute the first action on the first artifact:

analyzing permissions metadata associated with the first artifact to identify a third permission configuration rule to grant the first entity permission to execute a third action on a third artifact, wherein determining the system-generated modification for the security policy to configure permissions for the first entity to execute the first action the first artifact includes modifying the security policy to configure the permissions for the first entity to execute the third action on the third artifact.

9. The one or more non-transitory computer readable media of claim 1, wherein the permissions for the one or more entities to execute the first action on the first artifact further specify at least one condition, and wherein granting or rejecting the request is based in part on determining whether the at least one condition is met.

10. A method comprising:

receiving user input comprising a user-defined permission configuration rule that (a) configures permissions for one or more entities to execute a first action on a first artifact based on (b) updates to permissions for the one or more entities to execute a second action on a second artifact;

detecting an update to permissions for a first entity to execute the second action on the second artifact;

based on the user-defined permission configuration rule and the update to the permissions for the first entity to execute the second action on the second artifact, determining a system-generated modification for a security policy to configure permissions for the first entity to execute the first action on the first artifact;

executing the system-generated modification for the security policy to generate an updated security policy;

receiving, from the first entity, a request to execute the first action on the first artifact; and granting or rejecting the request based on the updated security policy, wherein the method is performed by at least one device including a hardware processor.

11. The method of claim 10, further comprising:

monitoring any updates to the security policy to detect the update to the permissions for the first entity to execute the second action on the second artifact.

12. The method of claim 11, further comprising:

storing metadata specifying a set of permission configuration rules for a set of action/artifact pairs, the set of permission configuration rules including the user-defined permission configuration rule for the second action and the second artifact, wherein monitoring any updates to the security policy includes monitoring the metadata to determine whether changes to the metadata correspond to modifications to one or more permission configuration rules.

13. The method of claim 10, wherein detecting the update to the permissions for the first entity to execute the second action on the second artifact comprises detecting that permission has been granted for the first entity to execute the second action on the second artifact, and wherein the system-generated modification comprises modifying the security policy to grant permission for the first entity to execute the second action on the second artifact.

14. The method of claim 10, wherein detecting the update to the permissions for the first entity to execute the second action on the second artifact comprises detecting that permission has been granted for the first entity to execute the second action on the second artifact, and wherein the system-generated modification comprises modifying the security policy to remove permission for the first entity to execute the second action on the second artifact.

15. The method of claim 10, further comprising iteratively updating the security policy at least by:

receiving a second user input defining a second user-defined permission configuration rule that triggers (a) permission for an entity to execute a third action on a third artifact based on (b) the entity being granted permission to execute the first action on the first artifact; and responsive to: (a) receiving the second user input defining the second user-defined permission configuration rule, and (b) detecting that the security policy has been updated to grant the first entity permission to execute the first action on the first artifact: updating the security policy to grant the first entity permission to execute the third action on the third artifact.

16. The method of claim 10, further comprising:

receiving a second user input defining a second user-defined permission configuration rule that triggers (a) permissions for entities to execute a third action on a third artifact based on (b) the entities being explicitly granted permission via user input to execute the first action on the first artifact;

detecting that the security policy has been updated by application of the user-defined permission configuration rule to grant the first entity permission to execute the first action on the first artifact; and refraining from updating the security policy to grant the first entity permission to execute the third action on the third artifact based on at least one of: (a) the permission to perform the first action on the first artifact was granted by the user-defined permission configuration rule or (b) permission to perform the first action on the first artifact was not explicitly granted via any user input.

17. The method of claim 10, further comprising:

determining a permission type associated with the first action and the first artifact; and based on (a) the permission type, and (b) detecting that the security policy has been updated by application of the user-defined permission configuration rule to grant the first entity permission to execute the first action on the first artifact:

analyzing permissions metadata associated with the first artifact to identify a third permission configuration rule to grant the first entity permission to execute a third action on a third artifact, wherein determining the system-generated modification for the security policy to configure permissions for the first entity to execute the first action the first artifact includes modifying the security policy to configure permissions for the first entity to execute the third action on the third artifact.

18. The method of claim 10, wherein the permissions for the one or more entities to execute the first action on the first artifact further specify at least one condition, and wherein granting or rejecting the request is based in part on determining whether the at least one condition is met.

19. A system comprising:

at least one device including a hardware processor;

the system being configured to perform operations comprising:

receiving user input comprising a user-defined permission configuration rule that (a) configures permissions for one or more entities to execute a first action on a first artifact based on (b) updates to permissions for the one or more entities to execute a second action on a second artifact;

detecting an update to permissions for a first entity to execute the second action on the second artifact;

based on the user-defined permission configuration rule and the update to the permissions for the first entity to execute the second action on the second artifact, determining a system-generated modification for a security policy to configure permissions for the first entity to execute the first action on the first artifact;

executing the system-generated modification for the security policy to generate an updated security policy;

receiving, from the first entity, a request to execute the first action on the first artifact; and granting or rejecting the request based on the updated security policy.

20. The system of claim 19, wherein the operations further comprise:

monitoring any updates to the security policy to detect the update to the permissions for the first entity to execute the second action on the second artifact.

* * * * *